United States Patent [19]

Ackeret

[11] 4,428,480

[45] Jan. 31, 1984

[54] CONTAINER FOR TAPE CASSETTES

[76] Inventor: Peter Ackeret, Schubelwis 4, CH-8700 Kusnacht, Switzerland

[21] Appl. No.: 367,074

[22] Filed: Apr. 9, 1982

[30] Foreign Application Priority Data

Apr. 9, 1981 [DE] Fed. Rep. of Germany ....... 3114298
Apr. 9, 1981 [DE] Fed. Rep. of Germany ....... 3114333

[51] Int. Cl.³ .......................................... B65D 85/672
[52] U.S. Cl. .................................. 206/387; 312/319; 312/333
[58] Field of Search ................. 206/1.5, 387; 312/319, 312/345, 349, 333, 350, 111, 10, 12, 330

[56] References Cited

U.S. PATENT DOCUMENTS

| 2,828,178 | 3/1958 | Dahlgren | 312/319 |
| 3,224,827 | 12/1965 | Foster et al. | 312/319 |
| 3,899,229 | 8/1975 | Ackeret | 206/387 |
| 3,904,259 | 9/1975 | Hoffmann et al. | 312/319 |
| 4,046,255 | 9/1977 | Ackeret | 206/1.5 |
| 4,191,292 | 3/1980 | Schweizer | 312/319 |

Primary Examiner—Joseph Man-Fu Moy
Assistant Examiner—David T. Fidei

[57] ABSTRACT

A container in which standard magnetic tape cassettes may be stored includes a drawer which is releaseably locked in a housing against a pre-tensioned ejection spring. The container may, at least in part, be comprised of transparent material and will accommodate a label which is located to one side of the cassette.

20 Claims, 7 Drawing Figures

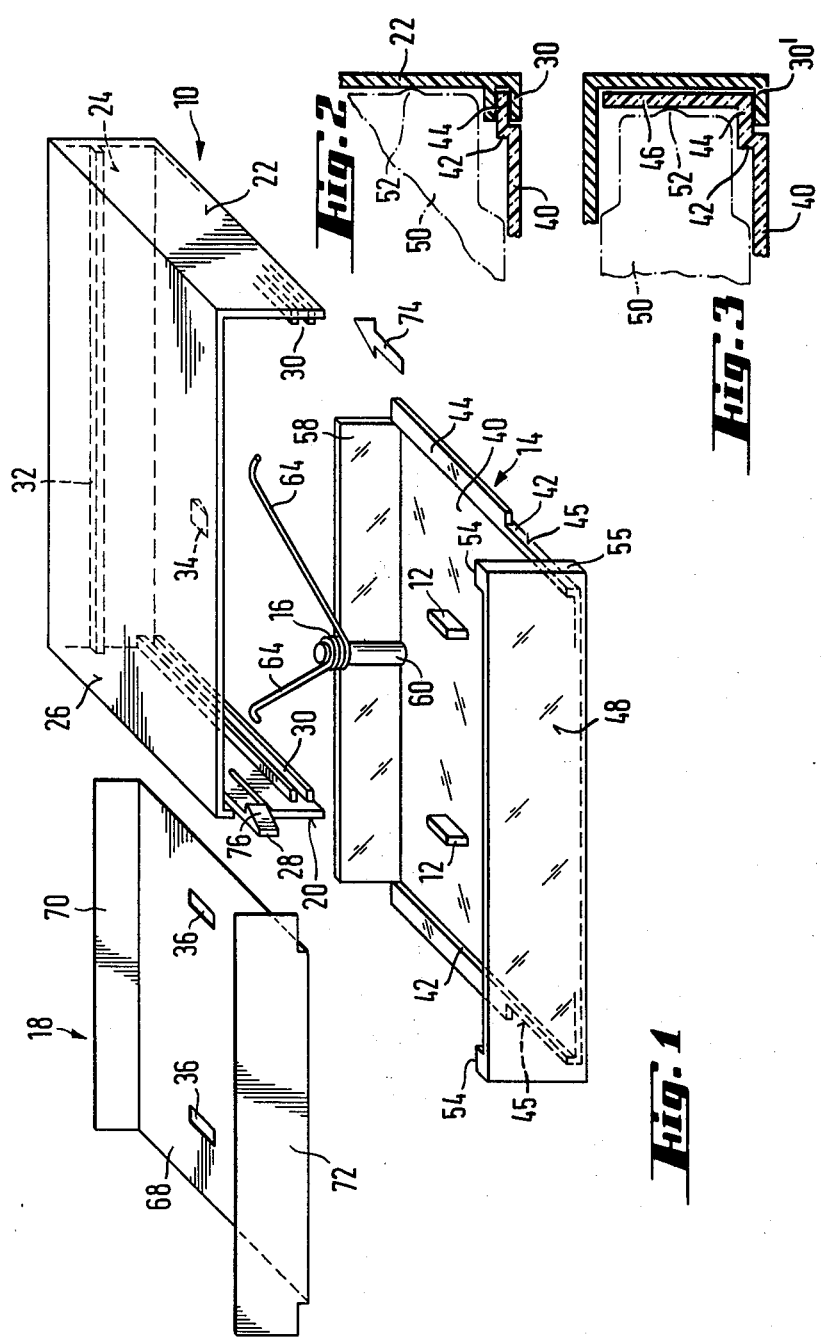

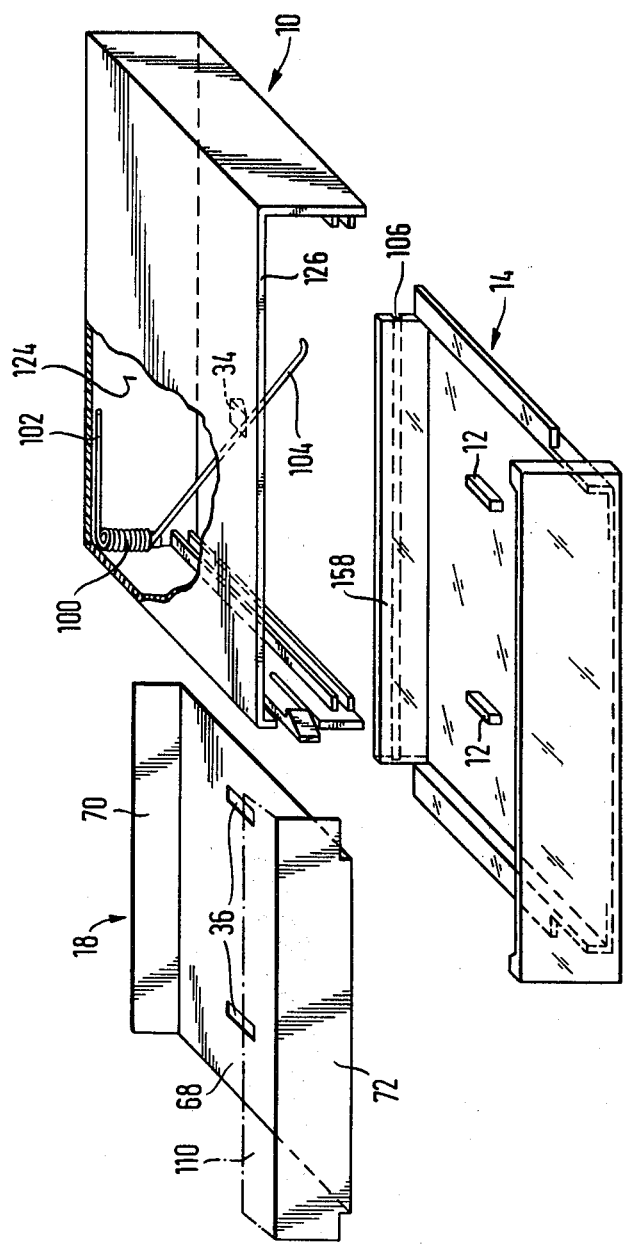

CONTAINER FOR TAPE CASSETTES

BACKGROUND OF THE INVENTION

(1) Field of the Invention

The present invention relates to the storage of standard magnetic tape cassettes and particularly to the packaging of such cassettes for display and retail sale. More specifically, this invention is directed to a container in which standard magnetic tape cassettes may be stored and displayed and especially to a cassette storage container comprising a housing and a spring biased cassette receiving drawer. Accordingly, the general objects of the present invention are to provide novel and improved methods and apparatus of such character.

(2) Description of the Prior Art

Storage containers for magnetic tape cassette are well known in the art. One form of such container comprises a housing having a drawer. The housing and drawer cooperate to define a substantially rectangular space which accommodates the cassette. In some prior art cassette storage containers the drawer is biased in the opening direction by means of an ejection spring ad the container is provided with a releaseable locking mechanism which retains the drawer in the inserted position. A cassette storage container of this type is disclosed in published West Germany Patent Application Ser. No. P 22 48 408. Storage containers of the type shown in the above-referenced publication provide practical and neat storage for magnetic tape cassettes while, at the same time, being suitable for retail display and sale of blank cassettes.

The previously available tape cassettes storage containers, including those described in the above-mentioned publication, have been found to be deficient for storing pre-recorded cassettes. This is partly because the prior containers which employ a spring-biased drawer require more shelf space than do the familiar transparent storage boxes which include a hinged closure member. The larger size of drawer-type cassette storage containers is necessitated by the fact the ejection spring, which enables one-handed use of the container, requires a relatively large amount of space. Further, the container requires reinforcing means to insure that the spring tension does not distort or break the container.

A further problem, which has weighed against the use of drawer-type cassette storage containers for the retailing of pre-recorded cassettes, resides in the difficulty of affixing an identifying label to the container. While the label could be adhesively secured to the exterior of the container, this presents the danger of the label being accidently separated from the container. As an alternative, the drawer-type container could be comprised of a transparent plastic material and a label inserted therein. The construction of previous drawer-type containers, however, was such that the ejection spring was apt to damage the label or the label might become jammed in the spring.

Thus, a problem of long standing in the art has been the provision of a drawer-type storage container for a standard magnetic tape cassette which has substantially the same dimensions as the familiar plastic box with hinged lid and which could easily be opened with one hand thereby permitting, for example, removal of the tape from the safety of the container by the operator of a motor vehicle.

SUMMARY OF THE INVENTION

The present invention overcomes the above-briefly discussed and other deficiencies of the prior art and, in so doing, provides a novel and improved container for a standard magnetic tape cassette. A container in accordance with the present invention comprises a housing, a drawer which is slidably received in the housing, an ejection spring which biases the drawer in the opening direction and a releaseable locking mechanism which retains the drawer in its inserted position against the bias of the ejection spring. The spring employed in the present invention is in the form of a coiled torsion spring which has a projecting leg at least at one end of the coil.

A container in accordance with the present invention may, at least in part, be fabricated from a transparent plastic material. Also in accordance with the present invention, the container is designed such that an identifying label may be inserted therein, so as to be readable through the wall of the housing, and the label will neither interfer with the operation of the ejection spring nor be damaged by the spring.

The housing and cooperating drawer of a container in accordance with the present invention cooperate to define a substantially rectangular space which accommodates a standard tape cassette. The container is provided with a stop whereby, under the influence of the ejection spring, the drawer will be opened a pre-determined amount in response to the release of the locking mechanism.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIG. 1 comprises an exploded perspective view of a container in accordance with a first embodiment of the invention;

FIG. 2 is a partial cross-sectional front elevation view of a container in accordance with a second embodiment of the invention;

FIG. 3 is a partial cross-sectional front elevation view of a container in accordance with a third embodiment of the invention;

FIG. 5 is an exploded perspective view, partly broken away, of a fourth embodiment of the present invention;

DESCRIPTION OF THE PREFERRED EMBODIMENTS

Figure 4:
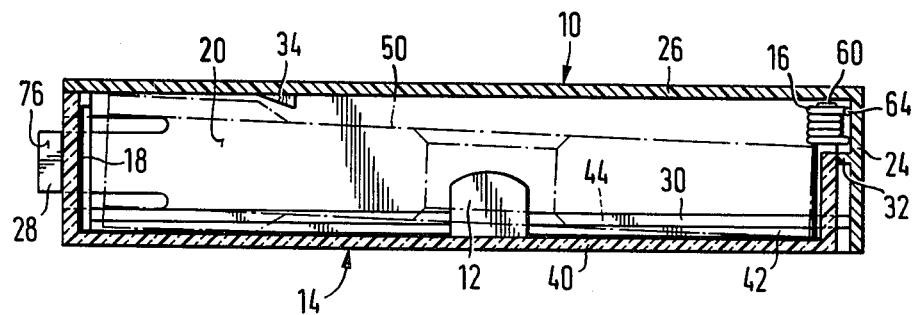
FIG. 4 is a schematic illustration of a container in accordance with the present invention in the closed and loaded condition.

With references now to FIGS. 1, 2 and 4, a container for a standard magnetic tape cassette in accordance with the present invention comprises a housing, indicated generally at 10, and a drawer, indicated generally at 14. The container further comprises an ejection spring, indicated generally at 16, and may accommodate a label, indicated generally at 18.

The housing 10 will be comprised of a suitable plastic material and will typically be formed by injection molding. Housing 10 includes a pair of parallel side walls 20 and 22, a rear wall 24 and a top wall 26. The outside surfaces of walls 20, 22, 24 and 26 are, in the disclosed embodiment, smooth. It will be understood, however, that the walls may be provided with stacking grooves and projections if desired. Side wall 20 is provided with a projection 28 which functions, in the manner to be described below, as a latch mechanism. On the inside thereof, in the FIG. 1 embodiment, the side walls 20 and 22 are each provided with a pair of parallel guide rails 30 which define a slot therebetween. In the FIG. 2 embodiment the lower of the guide rails 30 is at the base of the side walls whereas, in the embodiment of FIG. 3, only a single guide ledge 30', also at the base of each of the side walls, is employed. The rear wall 24 of housing 10 is provided, on its inner surface, with a horizontal ledge 32 which functions in the manner to be described below. A wedge-shaped stop 34 is provided on the inner surface of the top wall 26.

The drawer 14 is preferably formed from a transparent plastic material such as, for example, polystyrene. Drawer 14 includes a smooth, flat bottom plate 40. Parallel side rails 42 extend upwardly, a short distance, from opposite edges of plate 40. The distance between the side rails 42 will be less than the spacing between the facing inner edges of the guide rails 30 on housing 10. Guide elements 44 project transversely outwardly from the upper edges of side rails 42 along the major portion of the length thereof. The guide elements 44 are sized and shaped so as to be received in the slots defined by the guide rails 30 whereby the drawer 14 is movable relative to housing 10 by sliding the guide elements 44 in the slots defined by the guide rails 30. In the alternate construction depicted in FIG. 3, wherein the drawer is supported on and moves alongs a single lower guide rail 30', the drawer may be provided with side wall extensions 46 which are transverse to the guide elements 44 and extend from the outer edge thereof. The space between the side wall extensions 46 will be such as to accommodate the guide projections, indicated in phantom at 52 in FIGS. 2 and 3, which are provided on the sides of a standard magnetic tape cassette, the cassette being indicated schematically at 50 in FIGS. 2 and 3. It is to be noted that the dimensions of the container of the present invention, in the direction of the depth of the cassette, are not enlarged by the means for guiding the drawer in the housing since the guide means are outside the region where a standard cassette has a portion of increased thickness adjacent its tape-head opposing face.

Continuing to discuss the drawer 14, the bottom plate 40 is provided with a pair of projections 12 which engage, and thus function as stops, for the hubs of a tape cassette which will be inserted in the drawer. A front plate 48, which is transverse to the side rails 42, extends upwardly from bottom plate 40. The front plate 40 is provided, at the opposite ends thereof, with corner elements 54 which function as label holders. The guide elements 44 are terminated short of the front plate 48 so as to define a pair of opposed recesses 45 which facilitate the removal of a cassette from the drawer and which also enable the manufacture of the drawer in a simple injection mold. The above-described drawer construction eliminates molding problems such as having to provide an undercut for the corner elements 54 in order to enable the drawer to be removed from the mold. The corner elements 54 are stiffened by means of narrow projections 55 which extend outwardly to the base of front plate 48 as shown. In the embodiment of FIG. 1, the latch member 28, which projects from housing sidewall 20, will engage the front plate 48 in the region of the left-hand narrow edge protrusion 55 when the drawer 14 is fully inserted into the housing 10.

An end plate 58 extends upwardly, in the transverse direction, from the edge of bottom plate 40 which is disposed oppositely to the edge which joins front plate 48. The height of end plate 58 is such that it will, with the drawer fully inserted, abut the ledge 32 which extends inwardly from housing rear wall 24 as shown in FIG. 4. A mounting post 60 projects upwardly from the central region of end plate 58. Mounting post 60 is stiffened by being given a relatively large cross-sectional area and, preferrably, a semi-circular shape. The spring 16, which comprises a torsion spring having a helical coil or neck with a leg or end wire 64 projecting from each end of the neck, is installed on the post 60. The legs 64 of spring 16 extend toward rear wall 24 of the housing and, in the FIG. 1 embodiment, define a V-shaped ejection spring. The ends of this spring are bent in a radius as shown.

A label 18 to be employed in the container of the present invention will have a bottom portion 68 on the outer side of which the desired information will be imprinted. The bottom portion 68 of the label is dimensioned such that it will fit between the side rails 42 of drawer 14. The label 18 is also provided with an end tab 70 which will rest against end plate 58 of the drawer and a front tab 72 which abutts the inner face of front plate 48 of drawer 14. The corners of the front tab 72 will, with the label installed, be clamped under the corner elements 54 of drawer front plate 48. The label 18 is also provided with a pair of slots 36 in the bottom portion thereof and, with the label inserted, the projections 12 which extend upwardly from drawer base plate 40 will extend through slots 36.

After the label 18 and a cassette have been inserted in drawer 14, the drawer is pushed into housing 10 in the direction of the arrow 74 in FIG. 1. As the drawer is inserted the mounting post 60 will contact the stop 34 with the result that the stop will be driven upwardly thus causing the top wall 26 of housing 10 to deflect outwardly. As insertion of the drawer continues, post 60 will move past stop 34 whereupon the top 26 of housing 10 will return to its undeflected position and the drawer will be permanently captured within the housing by cooperation between stop 34 and post 60. During insertion of the drawer the curved ends of the arm 64 of spring 16 will contact the rear wall 24 of housing 10 in the region above the shelf 32 and as insertion of the drawer continues the arms 64 will spread outwardly and thus the drawer will be biased by spring 16 in the direction of opening. The ledge 32 prevents the ends of spring 16 from sliding downwardly on the rear wall 24 of housing 10. As insertion of the drawer continues, the reinforced left side edge of front plate 48 of the drawer will contact the inclined face 76 of the latch member 28 causing the latch member to spring outwardly. When the drawer is fully inserted the latch member will snap inwardly whereby the inwardly facing shoulder thereon will engage the front face of the drawer and retain the drawer in the inserted position against the bias of spring 16. Application of lateral pressure on the latch 28 will unlock the drawer whereupon, under the influence of spring 16, it will be opened to the point where post 16 contacts the inwardly facing shoulder of stop 34.

As may be seen from FIG. 4, the helical portion of spring 16 increases in diameter as the tension on the spring increases. However, the spring is located in a clearance space above a cassette, indicated by broken lines in FIG. 4, which is inserted in the container, the cassette being retained in an inclined position and being relatively thin in the region which abuts the rear plate 58 of drawer 14. Accordingly, the possibility of the spring damaging the cassette is eliminated in a container in accordance with the present invention.

As noted above, if desired a container in accordance with the present invention may be provided with surface irregularities which permit a plurality of the containers to be stacked. Such irregularities may be formed in the top wall 26 of housing 10 and/or the outwardly facing side of the lower guide rail 30 or 30' of the embodiments of FIGS. 2 and 3. Numerous other modifications, some of which will be mentioned below, may also be made to the tape cassette container without departing from the spirit and scope of the invention.

It is not essential that the housing 10 of a container in accordance with the invention be open at the bottom. Rather, the housing bottom may be closed by a transparent plate or, alternatively, it may be provided with cross-members at the front end or rear edges which cooperate with the rails 30 or 30' to define a frame. Similarly, the drawer 14 may be of open frame construction rather than being provided with front and bottom plates.

While not essential, it is desirable to include braking elements for stopping the winding hubs of a magnetic tape cassette inserted in the container. These braking elements, rather than being in the form of the projections 12 which extend upwardly from base plate 40, can be bonded to the inside of the label 18. As an alternative, the braking elements may be attached to a support which is secured within the drawer 14 after the label 18 has been inserted such as, for example, a support held between the side members 42. The braking elements similarly need not be of the type depicted in FIG. 1 but may, by way of example, be members which are displaced as the cassette is inserted and removed in the drawer.

Employment of a spring of the type depicted in FIG. 1 is preferred for reasons of manufacturing expense. In the case where the housing of the container is open at the bottom, as is the case of the embodiments described above, the spring should be secured so that it will not fall out when the container is open. This may be accomplished by securing the spring either to the drawer or the housing. It is important that the spring utilize the space which remains between the cassette and the housing where the cassette is relatively thin, i.e., the spring should not be in the region of the container which receives that portion of the cassette which is of increased thickness, i.e., that portion of the cassette which will, face a tape head when in use.

The stop 34 must be positioned in a location which will permit the housing to deflect outwardly when the drawer is inserted during initial assembly. Rather than being in the location depicted in FIG. 1, the stop 34 could, for example, be formed as part of the guide rail structure.

The latch mechanism similarly does not have to be in precisely the form depicted in FIG. 1. Again by way of example, the drawer 14 may be provided with a resilient locking bar which engages a projection on the housing.

It is also to be observed that at least one of the sides of housing 10 may be provided with a recess which will receive a manufacturer's label or other indicia providing means.

Referring now to FIG. 5, a further embodiment of the present invention is depicted. The embodiment of FIG. 5 differs from that of the above-described embodiments primarily with regard to the construction and mounting of the ejection spring. In the discussion below only those components which differ from those of the FIG. 1 embodiment will be described. The spring of the FIG. 5 embodiment comprises a coil 100 which has, extending outwardly from the opposite ends thereof, legs 102 and 104. The coil 100 is mounted within the housing in the corner where the side and rear walls thereof meet. The axis of the coil 100 is oriented perpendicularly with respect to the top wall 126 of the housing while the leg 102 contacts the inside of the rear wall 124 of the housing. The second, longer leg 104 of the spring extends into the cavity defined by the housing so as to contact the rear plate 152 of the drawer. The drawer rear plate is formed so as to have a groove 106 in the outwardly facing side thereof and this groove receives and guides the end of leg 104 of the spring. Since the main coil portion 100 of the spring is stationary, the end of leg 104 will slide in groove 106 as the drawer moves, the end of the spring being bent into a radius as shown to facilitate this sliding motion. In the FIG. 5 embodiment the coil portion of the spring is located in a region where, with a cassette in the drawer, the coil will be adjacent a rounded edge of the cassette. The fact that the standard cassette is provided with a rounded edge affords the necessary space for accommodating the spring.

The label depicted in FIG. 5 is provided with a strip 110 which, when the drawer is initially loaded and closed, may be adhesively bonded to the exterior of the housing to thereby provide the purchaser with some means for insuring that the cassette originally packaged in the container is still present therein.

Figure 7:
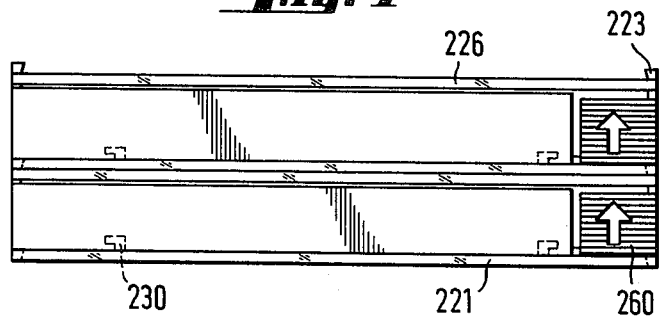
FIG. 7 is a front elevation view depicting two of the containers of the FIG. 6 embodiment joined together to define a storage unit.
Figure 6:
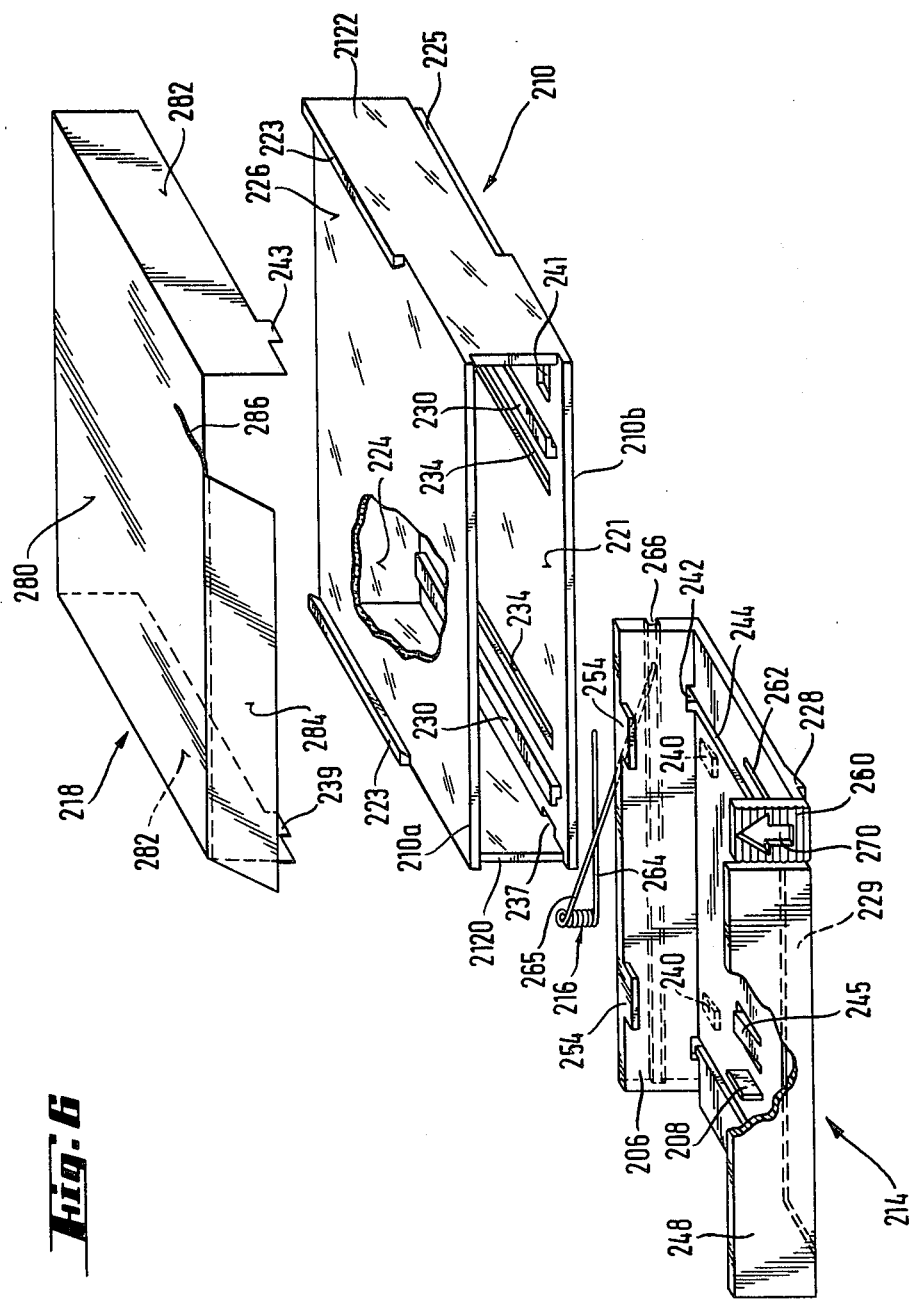
FIG. 6 is an exploded perspective view, partly broken away, of a fifth embodiment of the present invention.

Turning now to FIGS. 6 and 7, the embodiment of the container of the present invention depicted therein generally comprises a housing 210, a drawer 214, an ejection spring 216 and a label 218. The housing 210 is of two part construction. Thus, the housing is defined by a first portion 210a which has parallel side walls 2120 and 2122 and a top wall 226 which bridges the side walls. Housing portion 210a is injection molded, preferably from a transparent plastic material. The second portion 210b of housing 210 is also injection molded, preferably from a non-transparent, for example colored, plastic and comprises a bottom wall 221 and a rear wall 224. In the embodiment shown the top wall 226 of the first housing portion is provided, on its outer surface, with a pair of parallel stacking rails 223 and the bottom and side walls cooperate to define complimentary stacking grooves 225. The bottom wall 221 of housing portion 210b is also provided with integral guide rails 230 which have an undercut profile. Guide rails 230 extend substantially the entire depth of housing 210. The bottom wall 221 is also provided with a pair of parallel slots 234 which are positioned between the guide rails 230. A pair of oppositely situated apertures 237 and 241 are also provided in bottom wall 221 adjacent the open front end of the housing 210. Aperture 237 receives a positioning tab 239 on label 218 while aperture 241 receives a positioning tab 243 of the label. The aperture 241 is enlarged in the direction of the guide rails 230, when compared to aperture 237, and in part functions as a latching mechanism which receives a wedge-shaped latching member 228 molded into the bottom of drawer 214. The latching mechanism of the embodiment of FIG. 6 is of the same type described in above-mentioned published West German Patent Application P No. 22 48 408.

The injection molded housing portions 210a and 210b are bonded to one another along regions of contact between the narrow side walls and the bottom or top wall, for example by ultrasonic welding, or formed into an integral subassembly in ay other suitable manner. It is possible to injection mold the entire housing 210 from a transparent plastic material. If the housing is injection molded as the single part, however, the bottom wall 221 will, for asthetic reasons, preferrably be rendered opaque in any suitable manner and the rear wall 224 may also be similarly rendered opaque.

The drawer 214 is generally U-shaped and is preferably injection-molded from a non-transparent plastic material. The bottom plate of drawer 214 has the customary braking projections for the hubs of a cassette which will be received therein. The bottom plate of the drawer is also provided with parallel longitudinal slots 244 which are complimentary to the foot or base portions of the rails 230 which extend upwardly from the bottom 221 of housing 210. The slots 244 extend to the rear edge of the bottom plate of the drawer and the rear plate 206 of the drawer is provided, in registration with slots 244, with apertures 242 which are commensurate in shape with the head or top portions of rails 230. Accordingly, the drawer may be placed in a sliding engagement with the rails 230. The bottom plate of the drawer 214 is also provided with a recess or aperture 229 adjacent the front plate 248 of the drawer. The recess or aperture 229 receives the relatively thick portion of a cassette which is in the region surrounding that area in which the tape is exposed to the record-/playback head. This arrangement is similar to that described in published West German Patent Application Ser. No. P 25 21 371. The bottom plate of drawer 214 is also provided with a pair of camming tongues 245 which are cut from the bottom plate and pre-tensioned in the upward direction. The tongues 245 cause the relatively thin portion of a cassette, which will be disposed oppositely to the above-described relatively thick portion, to be positioned above the thicker portion. Two or more tabs 254 are molded into the rear plate 206 of the drawer and extend in the direction of the front plate 248. The tabs 254 function as holders for a cassette and also support the main face of the label 218 when the drawer is in the open position. Accordingly, when the drawer is reinserted the cassette stored therein does not run onto the edge of the label and bend the label.

A "button" 260 is cut from the material comprising the drawer with the slot 262 which separates the supporting arm portion of the "button" from the remainder of the drawer extending a significant distance toward the rear of the drawer. This arrangement defines a resilient latching mechanism which includes the above-mentioned latching projection 228. Thus, to release a fully inserted drawer, thereby permitting the drawer to move to the open position under the influence of the ejection spring, the "button" 260 is urged upwardly, in the direction of the arrow-shaped aperture 270, to raise latch projection 228 from opening 241 in bottom wall 221 of housing 210. By forming the direction indicator 270 in the form of an aperture, the user can, by looking through the aperture, determine whether there is a cassette in the container.

The ejection spring 216 of the FIG. 6 embodiment has a main coil portion and a pair of relatively long free legs 264 and 265 extending from opposite ends thereof. The leg 264 will lie in the joint defined by junction of bottom wall 221 and rear wall 224 of housing 210. In order to capture the spring leg 264 in this position, at least one of the rails 230 may be made to terminate a short distance from the rear wall 224 and/or a support projection can be molded into the housing. The spring 216 may, and in some cases must, be inserted before the housing portions 210a and 210b are permanently joined together.

Leg 265 of spring 216 is provided with a radius at its free end. This rounded end of spring leg 265 is engaged in a groove 266 formed in the outside of the rear plate 206 of drawer 214. This arrangement, as well as the mounting of the coil portion of the spring in a corner of the container, has been described above in the discussion of the FIG. 5 embodiment. The use of a pre-tensioned spring of the type described permits constructions wherein the locking and releasing of the drawer can be implemented using one or both legs of the spring. It is to be noted that a link guide or equivalent means may be provided at the rear plate of the drawer for cooperation with spring leg 265 thereby permitting the end of the spring leg to move both in the direction of movement of the drawer and also perpendicularly thereto. This arrangement provides a locking means which, when the drawer is inserted, engages a hook which projects forwardly from the other spring leg and, when the drawer is repeatedly given short pushes in the direction of insertion, will be released. The label of the FIG. 6 embodiment has a shape which corresponds to that of the transparent walls of the housing 210.

The label has a main face 280 which will typically have pictoral information imprinted thereon and side faces 282 which will typically have text imprinted thereon. The label 218 may also have a "security" face 284 which is connected to the main face by means of, for example, a tear thread 286. The security face 284 will be of reduced length, when compared to the remainder of the label, to leave the "button" 260 exposed. Security face 284 will also be provided with an adhesive, on its inner face, so that it may be bonded to the front plate 248 of drawer 214. If the container is used as a merchandising device, an undamaged tear thread insures that the cassette originally inserted is still in the container.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A container for use in the storage of a magnetic tape cassette comprising:
   a housing;
   an open topped drawer, said drawer being slidably received in said housing and cooperating therewith to define a tape cassette receiving recess;
   ejection spring means positioned within said housing and cooperating with a wall of said housing and said drawer to bias said drawer in the open direction, said spring means comprising a coiled torsion spring having a leg projecting from at least one end thereof, said torsion spring being positioned such that when a cassette is accommodated in the container with the tape-head opposing face of the cassette adjacent a front wall of said drawer the spring lies on the side of the cassette which faces away from the bottom of said drawer whereby the spring is disposed in the space left in the container on either side of the portion of increased thickness adjacent the tape-head opposing face of a standard magnetic tape cassette, and releasable latch means, said latch means being manually operated, said latch means retaining said drawer in the inserted position in said housing against the bias of said ejection spring means when said latch means is in the engaged condition.

2. The container of claim 1 wherein said spring comprises a helical coil with a leg projecting from each end thereof, said coil being positioned in a corner of said housing, and wherein said drawer is provided with a spring leg engaging slot which receives the free end of a first of said spring legs, the other of said spring legs contacting an internal wall of said housing, the force exerted on said legs maintaining said spring in position in said housing.

3. The container of claim 2 wherein said housing has generally transverse side and rear walls and said coil is located in a corner defined by the junction of the housing rear wall and a side wall.

4. A container as claimed in claim 1, wherein the spring comprises a helical coil with a respective projecting leg at each end of the coil, and the spring is stayed by one leg on the housing and by the other leg on the drawer, the axis of the coil being generally perpendicular to the bottom of the drawer.

5. A container as claimed in claim 4 wherein one of the coil legs is secured to the housing.

6. A container as claimed in claim 1 wherein said drawer includes mounting means for said spring means whereby said spring means moves with said drawer.

7. A container as claimed in claim 5 wherein at least one of the coil legs is guided in a slidable manner.

8. A container as claimed in claim 6 wherein a stop provided on the housing lies in the path of movement of a post provided on the drawer, the post serving as a counter-stop and to mount the coil.

9. A container as claimed in claim 8, wherein at the end of the drawer opposed to a front wall of the container there is provided a projecting part located substantially parallel to the front wall, the post forming a part of the end projecting part, and a guide for a leg of the spring being formed by a ledge that runs substantially parallel to a major external wall of the housing, the arrangement being such that when the drawer is pushed in the ledge lies over the end projecting part.

10. A container as claimed in claim 1, wherein the arrangement is such that a label can be inserted and those parts of the container in the region where lettering of the label is to appear are transparent.

11. A container as claimed in claim 1, wherein the housing is arranged to enclose a cassette on five of its six sides and is open at a narrow side, while the drawer is guided in a slidable manner past one major wall of the housing and also has a front wall to close the open narrow side of the housing, and the other major wall of the housing has a transparent region to make visible the main face of an inserted label having at least one tab attached laterally to the main face of the label, the said at least one tab being arranged to lie behind the corresponding narrow side wall of the housing, the same narrow side wall being likewise transparent and being integrally injection-molded together with the transparent broad side wall.

12. A container as claimed in claim 1 for a cassette having a portion of increased thickness in the region of its tape-head opposing face, wherein the housing is arranged to enclose a cassette by external walls of the housing on at least two of the opposed minor sides and one of the major sides of the cassette and the drawer is arranged to be guided in a slidable manner between the two parallel external walls of the housing and to lie with its bottom against the other major side of the cassette and with a respective end wall against each narrow face of the cassette where the housing has an opening, at least the bottom of the drawer and at least one front face of the drawer, at least in the largest part of their faces, being transparent, through which transparent face regions a label, inserted in the drawer when the container is used, can be seen even when the container is closed.

13. A container as claimed in claim 1 wherein, when a cassette is accommodated in the container, the tape-head opposing face of the cassette lies against a front wall of the drawer and the edge of the cassette opposed to the tape-head opposing face lies against the bottom of the drawer, at least part of the spring being accommodated in an approximately wedge-shaped space between the cassette and an adjacent major wall of the housing.

14. A container for use in the storage of a magnetic tape cassette comprising:

a housing;

an open-topped drawer, said drawer being slidably received in said housing and cooperating therewith to define a tape cassette receiving recess;

ejection spring means positioned within said housing and cooperating with a wall of said housing and said drawer to bias said drawer in the open direction, said spring means comprising a helical coil having a leg projecting from each end thereof, said coil being affixed to said drawer, said legs contacting an inner wall surface of said housing, said spring means being mounted on said drawer in such a manner as to cause said coil to be disposed on the side of a cassette which faces away from the bottom of said drawer when a cassette is received therein with the tape-head opposing face of the cassette abutting a front wall of said drawer whereby said coil is located in the space left in said container on either side of the portion of increased thickness adjacent the tape-head opposing face of a standard magnetic tape cassette; and releasable latch means, said latch means being manually operated, said latch means retaining said drawer in the inserted position in said housing against the bias of said spring means when said latch means is in the engaged condition.

15. The container of claim 14 wherein said housing encloses a magnetic tape cassette on five of its six sides and is open at a narrow side and wherein said drawer is guided in a slidable manner past one major wall of the housing, said drawer having a front wall which closes the narrow open side of said housing when the drawer is inserted, the other major wall of the housing having a transparent region whereby a label inserted in said housing will be visible.

16. The container of claim 14 wherein said housing includes a pair of external side walls which enclose a cassette on two opposed minor sides thereof, said external housing side walls being bridged by at least a further external wall which encloses a major side of the cassette, and wherein said drawer is slidably guided between said two opposed external side walls of said housing.

17. A container for use in the storage of a magnetic tape cassette comprising:

housing means, said housing means having at least a pair of opposed side walls, a top wall bridging said side walls and an end wall connecting said top and side walls, said housing means being open at the end opposite to said end wall;

open topped drawer means, said drawer means including a floor and a pair of oppositely disposed end walls, said drawer means defining a tape cassette receiving recess, said drawer means being slidably received in said housing means and cooperating therewith to define a tape cassette storage container;

ejection spring means, said spring means comprising a helical coil having a leg projecting outwardly from each end thereof, said coil having an axis;

means for mounting said spring means with said coil axis oriented generally parallel with respect to said housing means end wall, said mounting means positioning said spring means within said housing means such that said spring means cooperates with said housing means end wall and one of said drawer means end walls to bias said drawer means toward said housing means open end; and releasable latch means, said latch means being manually operated, said latch means retaining said drawer means in the inserted position in said housing means against the bias of said ejection spring means when said latch means is in the engaged condition.

18. The container of claim 17 wherein said drawer means is provided with a spring-like engaging slot which receives the free end of a first leg of said ejection spring means helical coil, the other of said coil legs contacting an internal wall of said housing means, the force exerted on said legs maintaining said spring means in position in said housing means.

19. The container of claim 18 wherein said spring means helical coil is located in a corner defined by the junction of said housing means end wall and one of said housing means side walls.

20. A container as claimed in claim 4 wherein one of the coil legs is secured to the drawer.

* * * * *